C. C. CARTER.
REGULATOR FOR INCUBATORS.
APPLICATION FILED FEB. 18, 1916.
1,243,707.
Patented Oct. 23, 1917.
2 SHEETS—SHEET 1.
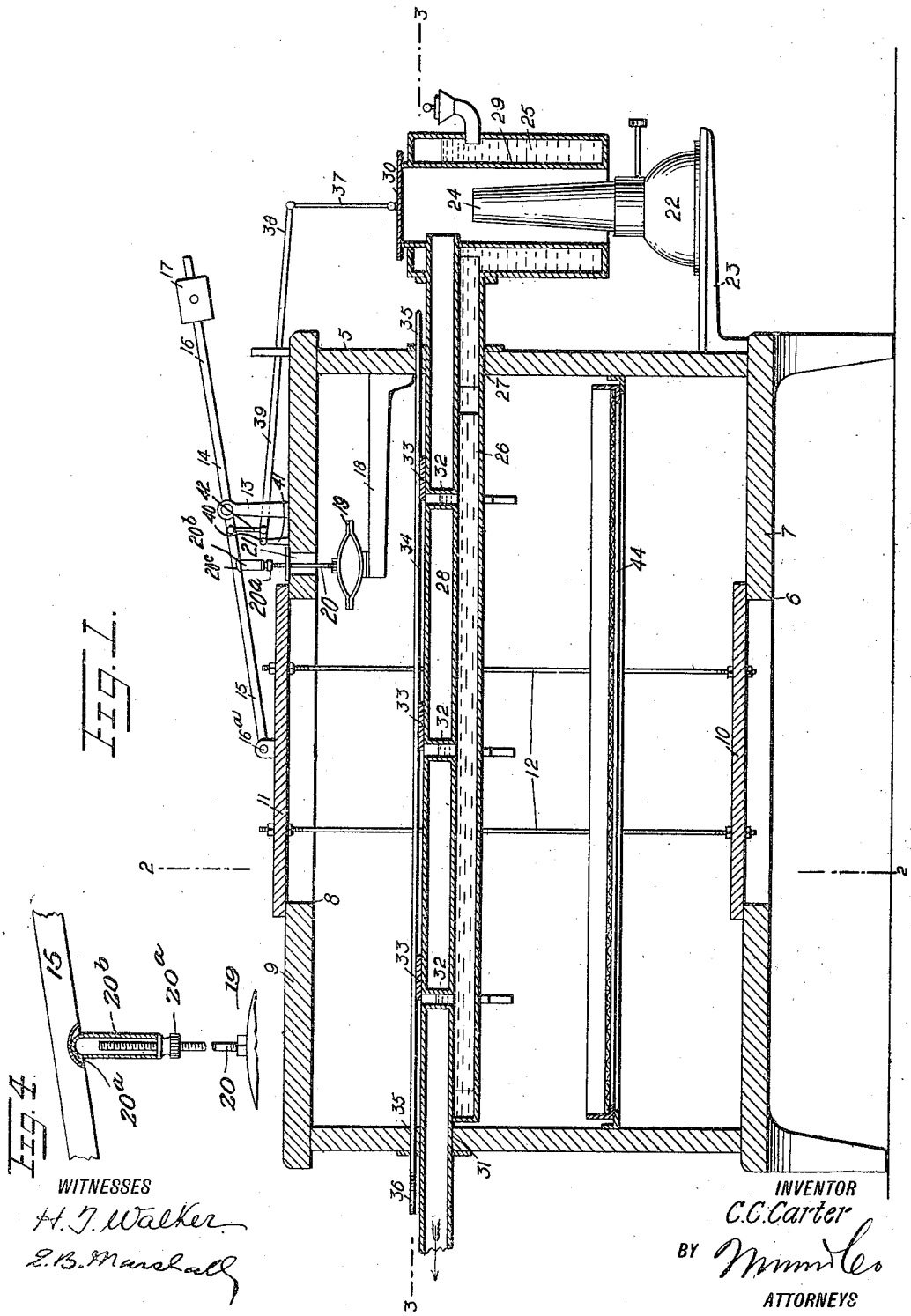
WITNESSES
H. J. Walker
E. B. Marshall
INVENTOR
C. C. Carter
BY
ATTORNEYS C. C. CARTER.
REGULATOR FOR INCUBATORS.
APPLICATION FILED FEB. 18, 1916.
1,243,707.
Patented Oct. 23, 1917.
2 SHEETS—SHEET 2.
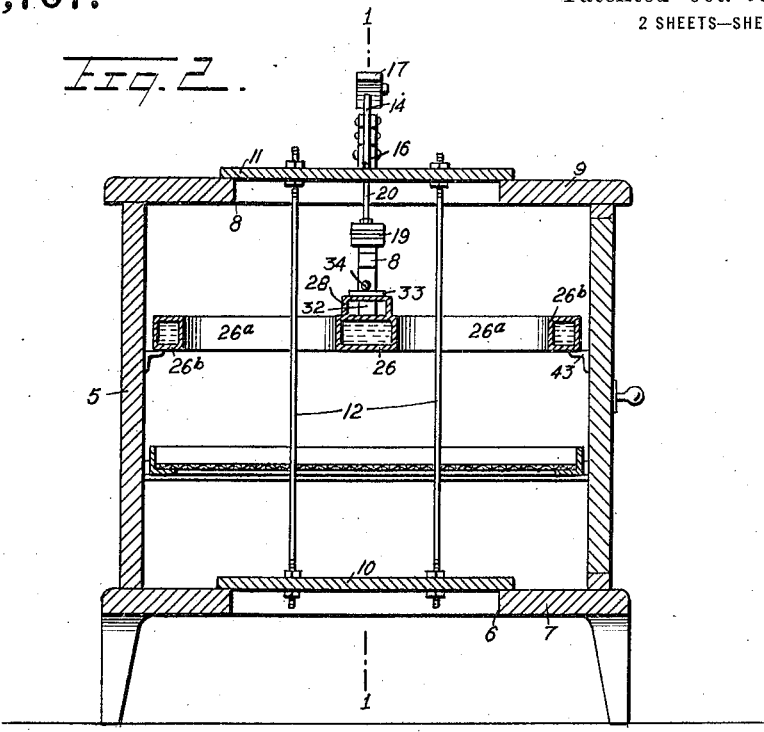
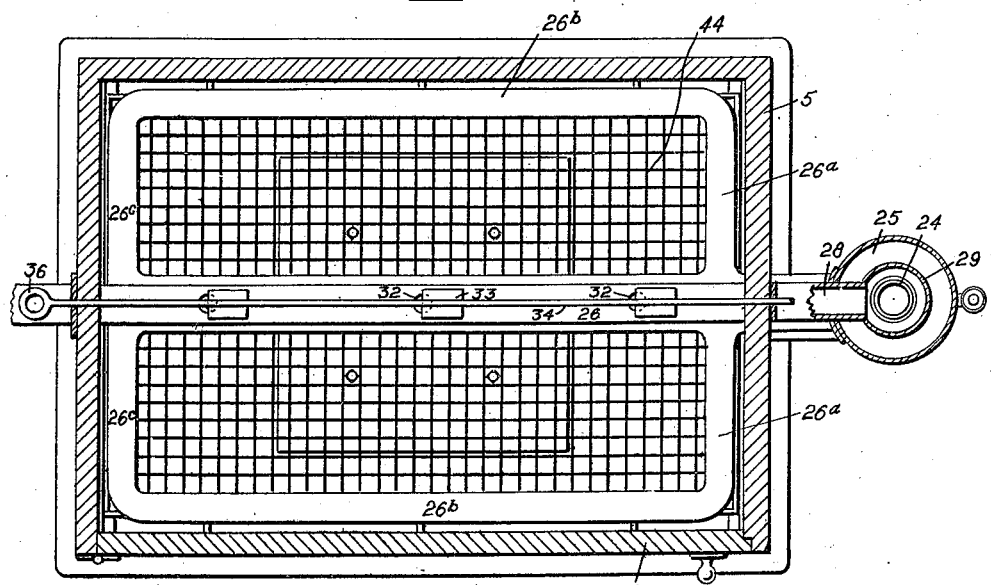
WITNESSES
H. J. Walker
L. B. Marshall
INVENTOR
C. C. Carter
BY
ATTORNEYS

UNITED STATES PATENT OFFICE.

CURTIS C. CARTER, OF BLUFFS, ILLINOIS.

REGULATOR FOR INCUBATORS.

1,243,707.  Specification of Letters Patent.  Patented Oct. 23, 1917.

Application filed February 18, 1916. Serial No. 79,045.

*To all whom it may concern:*

Be it known that I, CURTIS C. CARTER, a citizen of the United States, and a resident of Bluffs, in the county of Scott and State of Illinois, have invented a new and Improved Regulator for Incubators, of which the following is a full, clear, and exact description.

My invention has for its object to provide an incubator having members which may be opened to quickly cool and change the air in the incubator when the temperature in the incubator rises above a predetermined point, the means provided for opening the members also serving to open a damper connected with the incubator heater.

Another object of the invention is to provide the incubator with a flue connected with the heater adjacent which there is a water leg connected with a water jacket disposed around the heater, it being possible to open communication between the interior of the water leg and the incubator when desired, for increasing the moisture in the incubator.

Still other objects of the invention will appear in the following specification in which the preferred form of my invention is described.

In the drawings similar reference characters denote similar parts in all the views, in which—

Figure 1 is a sectional view on the line 1—1 of Fig. 2;

Fig. 2 is a view on the line 2—2 of Fig. 1;

Fig. 3 is a sectional view on the line 3—3 of Fig. 1, and

Fig. 4 is a fragmentary sectional view showing the connection of the thermostat with the operating lever.

By referring to the drawings, it will be seen that the incubator is provided with a casing 5 having an opening 6 in its bottom 7, and an opening 8 in its top 9, a member 10 being provided for closing the opening 6, and a member 11 being provided for closing the opening 8. These members 10 and 11 are connected by rods 12, so that when the member 11 is raised, it will carry with it the member 10, thereby opening the doorways 8 and 6 at the same time. A bracket 13 is mounted on the top 9 of the casing 5, and this bracket 13 serves as a fulcrum for a lever 14, an arm 15 of which is articulated at $16^a$ to the door 11, the other arm 16 of the lever being provided with a counterweight 17, it being possible to adjust this counterweight 17 on the arm 16 of the lever 14 as may be desired, in a manner readily understood. Disposed on a bracket 18 within the incubator casing 5, there is a thermostat 19, a rod 20 being secured to the thermostat 19, the rod 20 passing through an opening 21 in the casing 5. Mounted on the rod 20, there is a cap $20^b$, which is disposed in a recess $20^c$ in the arm 15 of the lever 14. It will be understood that when the thermostat expands, it will operate the lever 14, with the assistance of the counterweight 17, to raise the members 11 and 10, thereby lowering the temperature of the interior of the incubator casing 5 by permitting the passage of cool and fresh air to the incubator. The top of the rod 20 is threaded and meshing with this thread there is a nut $20^a$ which may be adjusted up or down to raise or lower the cap $20^b$ as may be desired, the cap $20^b$ being supported on the nut $20^a$.

The incubator is heated by a heater, which may be a lamp 22, which I show in the drawings mounted on a bracket 23 secured to the side of the casing 5. Disposed around the upper portion 24 of this lamp 22 there is a water jacket 25, from which extends a water leg 26, this water leg 26 passing through an opening 27 in the casing 5, and being disposed within the casing. Disposed above the water leg 26 there is a flue 28 which also passes through the opening 27 in the casing 5, this flue extending from the passage around the lamp 22 formed by the inner wall 29 of the water jacket 25. This passage formed by the wall 29 is normally closed at its top by a damper 30, and air is admitted to this passage formed by the wall 29 around the lamp 22. It will be seen that when the damper 30 is closed, all the heated air directed upwardly by the lamp will pass through the flue 28, and that this heated air will assist in keeping the water in the water leg 26 at the proper temperature. As indicated in Fig. 1 of the drawings, the flue 28 passes out of the incubator casing through an opening 31 in the incubator wall. The water leg 26 has extensions 32 which pass up through the flue 28, and which at their upper ends afford communication with the interior of the incubator casing, so that the air in the incubator may be moistened as desired, it being possible to regulate the openings at the top of the extensions 32 by dampers 33 which are secured to a rod 34 disposed in bearings 35 in the walls of the casing 5, a handle 36 with which the rod 34 is provided being outside the casing.

As has been stated, the thermostat, by means of the rod 20, the lever 14 and the counterweight 17, serves to open or close the members 11 and 10. This thermostat 19 also serves to raise and lower the damper 30, the said damper 30 being connected by a link 37 with an arm 38 of a lever 39, the lever 39 being fulcrumed at 40 to a bracket 41 mounted on the top 9 of the casing 5, the said lever 39 being also connected with the arm 15 of the lever 14 by means of a link 42. It will, therefore, be seen that when the temperature in the incubator casing 5 rises beyond a predetermined point, with the expansion of the thermostat 19, the members 11 and 10 will be raised to permit a rapid circulation of cool air within the incubator casing 5, and that at the same time the damper 30 will be raised, so that the hot air from the lamp 22 will rise, and will not pass through the flue 32. In this way, the temperature in the incubator casing 5 may be quickly lowered, but with the assurance that the temperature may be raised quickly, for when the temperature falls below a predetermined point, the thermostat 19 will contract, thereby serving, by the means which have been described, to close the doors 11 and 10, and also the damper 30. When the damper 30 is raised the air will move in the flue 28 in the direction of the lamp and the flue 28 will be cooled by the cool air entering the flue.

It will be seen that the water leg 26 has branches 26$^a$, which extend laterally and then, at 26$^b$, substantially parallel with the main water leg 26, and then back again at 26$^c$, to connect with the main water leg 26, the said water leg 26 with its branches forming a frame, which is supported on brackets 43 which are secured to the walls of the incubator casing. An egg tray 44 is disposed below the water leg 26, and may be reached through a door 45 in the casing.

Having thus described my invention, what I claim as new and desire to secure by Letters Patent, is:

1. In an incubator, a casing having two openings one for the ingress and the other for the egress of air, members for closing the two openings, a lever, means for operating the members adapted to be actuated by the lever, a thermostat in the casing, means connecting the thermostat with the lever for operating the latter, a heater for the casing, a damper for the heater, a second lever to which the damper is secured, and a link connecting the first lever with the second lever.

2. In an incubator, a casing having a bottom with an opening and a top with two openings, a member for closing the bottom opening, a second member for closing one of the openings in the top of the casing, operating means connecting the two members, a thermostat in the casing, a lever disposed at the outer side of the casing and articulated to the second member, a threaded rod passing through the other opening through the top of the casing and secured to the thermostat, a nut meshing with the thread on the rod, and a catch supported on the rod by the nut and engaging the lever for operating the latter.

3. In an incubator, a casing having two openings, a member for closing one of the openings, a thermostat in the casing, a lever disposed at the outer side of the casing and articulated to the member, a threaded rod passing through the other opening and secured to the thermostat, a nut meshing with the thread on the rod, and a cap supported on the rod by the nut and engaging the lever for operating the latter.

4. In an incubator, a casing having two openings, one disposed above the other, members for closing the openings, a lever, means by which one arm of the lever is adapted to operate the members, a counterweight on the other arm of the lever, a thermostat in the casing, means connecting the thermostat with the lever for operating the latter, a heater for the casing, a damper for the heater, a second lever to which the damper is secured, and a link connecting the first arm of the first lever with the second lever.

In testimony whereof I have signed my name to this specification in the presence of two subscribing witnesses.

CURTIS C. CARTER.

Witnesses:
C. R. HALE,
E. L. KENDALL.

Copies of this patent may be obtained for five cents each, by addressing the "Commissioner of Patents, Washington, D. C."